Figure 1:
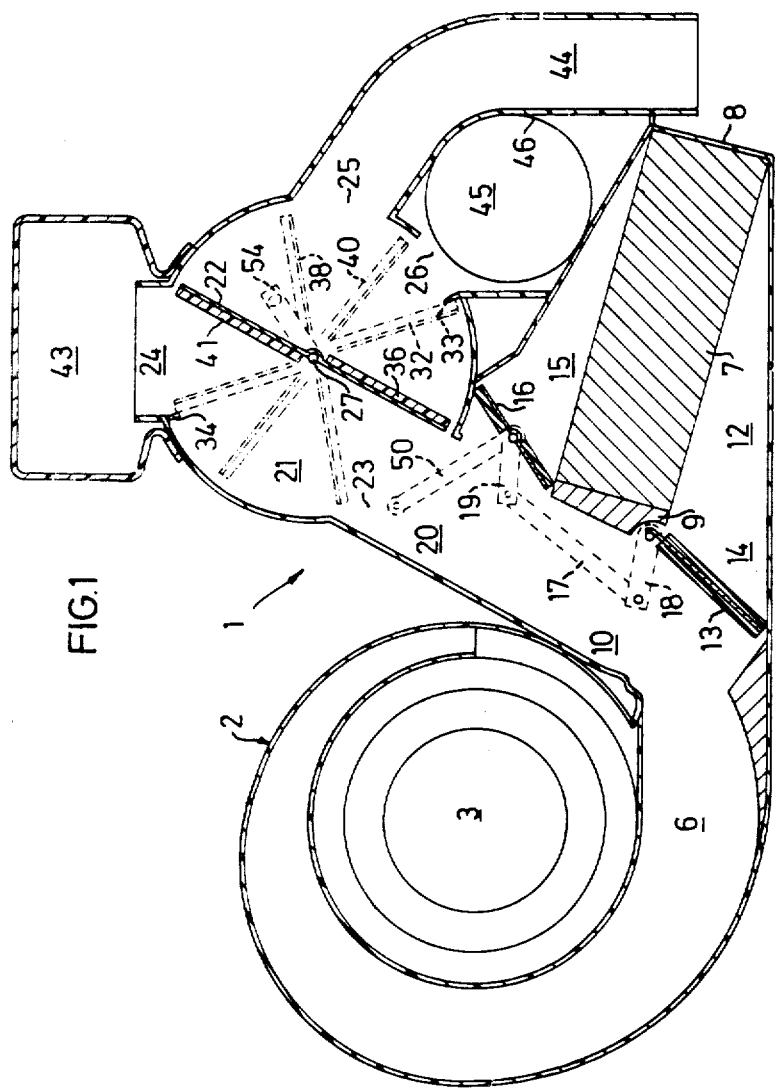

United States Patent [19]

Nilsson

[11] 4,390,124
[45] Jun. 28, 1983

[54] HEATING AND VENTILATION SYSTEM FOR VEHICLES
[75] Inventor: Sten E. Nilsson, Vargön, Sweden
[73] Assignee: Saab-Scania Aktiebolag, Sodertalje, Sweden
[21] Appl. No.: 237,109
[22] Filed: Feb. 23, 1981
[30] Foreign Application Priority Data
    Feb. 27, 1980 [SE] Sweden ............... 8001514
[51] Int. Cl.³ ............................................. B60H 1/02
[52] U.S. Cl. .............................. 237/12.3 A; 98/2.05;
                                                165/41; 165/126
[58] Field of Search ................... 237/12.3 A, 13;
                                98/2.04, 2.05, 2.06, 2.07, 2; 165/41, 122, 126

[56]              References Cited
            U.S. PATENT DOCUMENTS
    3,661,069  5/1972  Grosseau ............... 98/2.05
           FOREIGN PATENT DOCUMENTS
    2027226  9/1970  Fed. Rep. of Germany ........... 98/2
    2310934  9/1974  Fed. Rep. of Germany ....... 98/2.06
    2742670  4/1979  Fed. Rep. of Germany ....... 98/2.06
    2757651  6/1979  Fed. Rep. of Germany ....... 98/2.06

Primary Examiner—William R. Cline
Assistant Examiner—John F. McNally
Attorney, Agent, or Firm—Cushman, Darby & Cushman

[57]                ABSTRACT

A heating and ventilation system for a vehicle, including a ventilation housing comprising two housing halves mutually connected along at least one longitudinal plane, said halves forming together a space for the flow of air and enclosing fan means, a heat exchanger and a number of flap means for regulating the air flow. In the ventilation housing there is mounted a longitudinal intermediate wall between the housing halves. Said wall at least partially divides the space between the housing halves into two part spaces, each including a cold air duct, a hot air duct, a mixing chamber and a distribution chamber for leading ventilation air to different outlets in a vehicle passenger compartment. Said system enables using simple means to obtain individual regulation and heating of ventilation air at different outlets in a vehicle passenger compartment.

5 Claims, 4 Drawing Figures

HEATING AND VENTILATION SYSTEM FOR VEHICLES

The present invention relates to a heating and ventilation system for a vehicle, including a ventilation housing comprising two housing halves mutually connected along at least one longitudinal plane and forming together a space for the passage of air and also enclosing fan means, a heat exchanger and a plurality of flap means for regulating the airflow.

In the passenger compartment of a vehicle it is often desirable to execute individual regulation of ventilation air and air temperature in different parts of the compartment. For this purpose it is already known to arrange heating of the ventilation air to the driver's seat and the respective passenger seat in two entirely separate heating and ventilation systems. This is a solution which is both costly and voluminous, however.

From other known solutions of the problem in question it is also known to attempt the separation of unheated and heated ventilation air before it is led out to different ports in the passenger compartment of a vehicle. By controlling with different flaps, e.g. according to German Lay-open Print DOS No. 2757651, or slide means, e.g. according to German Lay-open Print DOS No. 2742670, different proportions of heated and unheated ventilation air can be distributed to different parts of the passenger compartment. However, the method signifies a not inconsiderable cross flow, resulting in that differences in temperature of the ventilation air in different nozzles can only be varied within given limits. Thus it is not possible to obtain only heated air in one compartment port and only unheated air in another compartment port.

The present invention has the object of forming a heating and ventilation system enabling such regulation of the ventilation air at different ports in the passenger compartment.

The invention is essentially distinguished in that in the ventilation housing there is mounted a longitudinal intermediate wall between the housing halves, said wall at least partially separating the space between the housing halves into two part spaces, each including a cold air duct, a hot air duct, a mixing chamber and a distribution chamber for leading ventilation air to different outlets in the passenger compartment of the vehicle.

The intermediate wall preferably comprises at least one flat plate mounted between the housing halves, and the distribution chamber comprises a cylindrical drum accommodating a distribution flap. In an advantageous embodiment, said flap comprises a plate, inserted diametrically into each distribution chamber and extending in the longitudinal direction of each distribution chamber, this plate being rotatably mounted about the centre-line of the distribution chamber.

By placing the intermediate wall between the housing halves in the ventilation housing there is obtained from the aspect of manufacture a simple and cheap method of warming and leading ventilation air to different ports in the passenger compartment.

Figure 2:
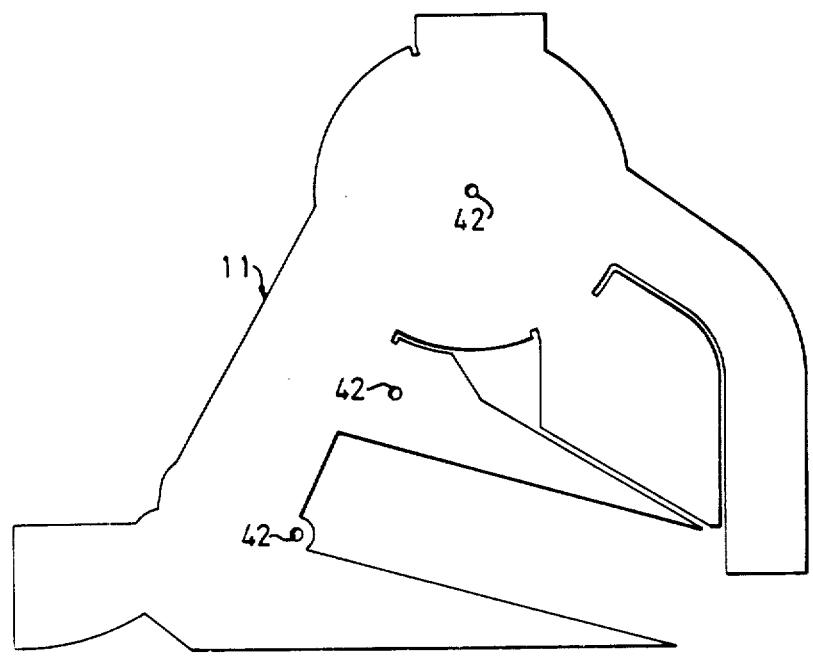
Figure 3:
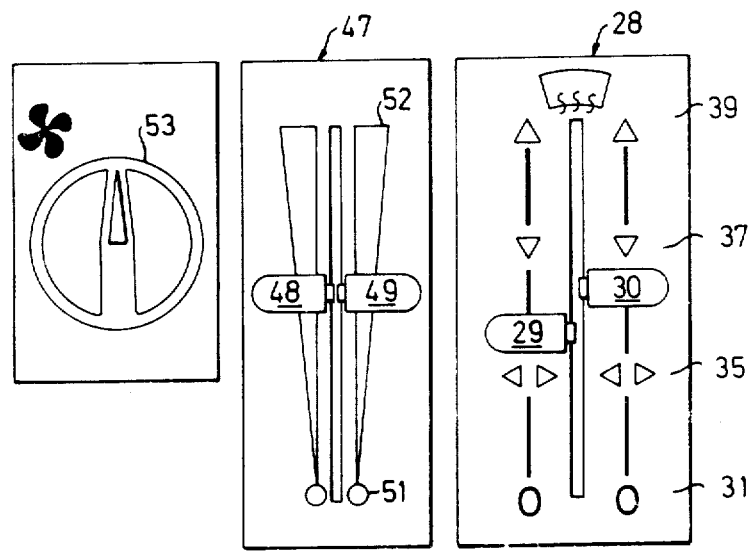

Further distinguishing features of the invention will be apparent from the following description of an embodiment exemplifying the invention, and the patent claims appended. The description is executed with reference to the attached drawings, of which FIG. 1 is a cross section of a ventilation housing formed in accordance with the invention, FIG. 2 is a plan view of a plate intended as an intermediate wall, FIG. 3 is a plan view of a control panel for the operating means incorporated in the ventilation system, and FIG. 4 is a perspective view of a ventilation housing.

A heating and ventilation system formed in accordance with the invention includes a ventilation housing 1 which is conventionally arranged in a vehicle for leading ventilation air to a plurality of nozzles opening out in the vehicle passenger compartment. The ventilation housing 1, which is preferably manufactured of a plastics material, comprises two housing halves 2 with a parting plane adapted in the longitudinal direction of the housing 1. The housing halves 2, one of which is illustrated in FIG. 1, are substantially alike but one being a mirror inversion of the other. A transverse recess 3 in the ventilation housing 1 is intended for mounting an electric centrifugal fan (not shown). The fan is conventionally provided with a fitting flange, intended for attachment to the ventilation housing 1 by means of a screwed joint. The fan is adapted for sucking in air via an air intake and an axial inlet, the fan then blowing the air into an inlet chamber 6 in the ventilation housing 1.

A heat exchanger 7 is mounted between the housing halves 2, this heat exchanger also bearing against a side surface 8 of the ventilation housing 1. The housing halves 2 are provided with a plurality of protuberances (not shown), which further locate the heat exchanger 7. The two housing halves 2 are each formed with a transverse supporting member 9, mutually engaging on assembly. The supporting members 9 serve as further support to the heat exchanger 7 and also as heat insulation for it in relation to a cold air duct 10 in the ventilation housing 1. The heat exchanger 7 is adapted for a continuous flow-through of heated coolant from the vehicle engine, and with relation hereto, the heat exchanger 7 is provided with an inlet pipe and an outlet pipe (not shown).

Figure 4:
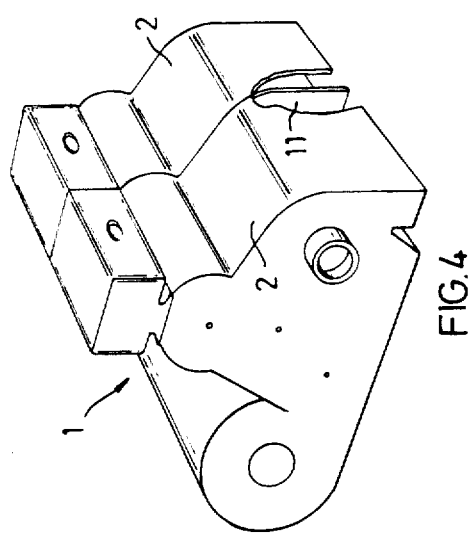

As can be seen from FIG. 4, a longitudinal intermediate wall 11 in the form of a flat plate is mounted between the housing halves 2 in the housing 1. The intermediate wall 11 divides a space defined between the two housing halves 2 into two longitudinal part spaces. The intermediate wall 11, of which a plan view is depicted in FIG. 2, extends substantially for the entire longitudinal direction of the ventilation housing 1, excepting in the space taken up by the fan and a portion of the space designated as inlet chambers 6. As previously mentioned, the intermediate wall divides the ventilation housing 1 into two similar but mirror-inverted spaces, through which ventilation air can be led to ports in the vehicle passenger compartment, e.g. close to the driver's seat or to a passenger seat. In relation thereto, the following description is limited only to relate to one longitudinal partial space in the ventilation housing 1.

The inlet chamber 6 of the ventilation housing 1 is in communication with a cold air duct 10 and a hot air duct 12, of which the latter can be regarded as constituting a parallel branch duct to the former, and vice versa. A pivotably mounted flap 13 is adapted at the inlet 14 of the hot air duct 12 to regulate the amount of air supplied to said duct 12. Such led-in air is caused to pass the heat exchanger 7 and is there heated in a manner known per se. The outlet 15 of the hot air duct 12 is also provided with a pivotably mounted flap 16 for enabling exact control of the amount of air passing through the hot air duct 12. The second flap 16 is connected to the first flap 13 such that a connection link 17 connects a lever 18 for turning the flap 13 with a lever 19 for turning the second flap 16.

Air which is led only through the cold air duct 10 is not heated. The previously mentioned support members 9 thereby constitute heat insulation in relation to the hot air duct 12 and the heat exchanger 7.

Air led along in the cold air duct 10 and the hot air duct 12 in the ventilation housing 1 is subsequently mixed in a mixing chamber 20, the proportions between cold and hot air determining the temperature for air departing from the mixing chamber 20. This air is led further to a distribution chamber 21, from where the ventilation air is distributed to different nozzles in the vehicle passenger compartment.

The distribution chamber 21 comprises a cylindrical compartment formed in the ventilation housing 1, in the periphery of said compartment there being arranged an inlet opening 23 and three outlet openings 24,25,26. A distribution flap 22 is pivotably mounted in the distribution chamber 21, the air flowing into the chamber 21 being distributed by this flap to the different outlets 24,25,26. These comprise a panel outlet 24, a floor outlet 25 and/or a defroster outlet 26, these outlets 24,25,26 being adapted in the distribution chamber 21 within a sector of less than 180°. The inlet 23 is arranged outside said sector. The pivotably mounted distribution flap 22 comprises a substantially flat and rectangular plate which is attached to a flap shaft 27 rotatably mounted in the ventilation housing 1 in register with the centreline of the distribution chamber 21. A lever 54 rigidly fixed to the flat shaft 27 is connected via conventional wire means (not shown) to a regulating means incorporated in a control panel 28 for the instrument equipment of the vehicle.

The distribution flap 22, like the other flaps 13,16 accommodated in the ventilation housing 1, is preferably provided with a foam plastics coating adhered to the flap 22. This is to improve the seal when the flap 22 assumes a closed position. Mounting of all flaps 13,16,22 is such that the said flaps are rigidly connected to their respective shafts which are mounted in a hole 42 through the intermediate wall 11 and in the ventilation housing 1.

In accordance with the previously stated condition, the above description is limited to relate to one-half of the interior space of the ventilation housing 1, since the other half has a similar structure and function. One-half of the ventilation housing leads ventilation air to outlets on one-half of the vehicle passenger compartment, while the other half of the ventilation system leads ventilation air to outlets on the other side of the passenger compartment. This enables individual regulation of the ventilation air on the respective sides of the vehicle passenger compartment.

Regulation means for the distribution flaps 22 arranged in the ventilation housing 1 comprise two parallel sliding controls 29,30 preferably placed side by side and incorporated in a common control panel on the vehicle fascia board. Each sliding control 29,30 is adapted for giving the respective distribution flap a pivotational movement in response to sliding movement of the control. When a sliding control 29,30 is caused to assume a lower position 31, a so-called O-position, the corresponding distribution flap 22 assumes a position closing the communication between the inlet 23 and the respective outlet 24,25,26 in the distribution chamber 21. In said position, indicated by the numeral 32 in FIG. 2, the distribution flap 22 engages sealingly against two stops 33,34 arranged in the distribution chamber 21.

For successive displacement of a sliding control 29,30 upwards, the corresponding distribution flap 22 will be turned clockwise. In a position corresponding to about one-third of the maximum travel of the control 29,30, the distribution flap 22 assumes a position where all ventilation air passes to the panel outlets 24, said position being called panel position, and is designated in FIG. 1 by the numeral 36. For continued displacement of the sliding control 29,30 to a position approximately corresponding to two-thirds of maximum control travel, the distribution flap 22 assumes a position where the ventilation air is partly taken to the floor outlet 25 and partly to the defroster outlet 26. Said position is called the floor position and is denoted by the numeral 38 in FIG. 1. In the upper end position 39 of the sliding control 29,30, the distribution flap 22 assumes a position where air is solely supplied to the defroster outlets 26. Said position is called the defroster position and is indicated by the numeral 40 in FIG. 1. The distribution flaps 22 can also assume intermediate positions relative to the above-mentioned basic positions 32,36,38,40, and in these positions the ventilation air is distributed to the different outlets 24,25,26 in relation to the settings of the sliding controls 29,30.

The operating panel 28 for the two distribution flaps 22 comprises the above-mentioned two sliding controls 29,30. By having these placed side by side and mutually parallel, is is easy to carry out both individual and common adjustments to the sliding controls 29,30.

Ventilation air is distributed from the outlets 24,25,26 of the distribution chamber to different nozzles in the vehicle passenger compartment. The air is thus distributed to panel nozzles (not shown) via a ventilation duct 43 placed transversely in the vehicle and directly connected to the ventilation housing 1. This duct 43 is separated in the middle so that air can be distributed separately to each side of the vehicle.

Distribution of ventilation air to the vehicle floor nozzles is done via ducts 44, built integral with the ventilation housing 1. Division of ventilation air to the driver's seat and to the passenger seat, respectively, is accomplished by means of the intermediate wall 11, the configuration of which is apparent from FIG. 2 where it will be seen that said wall has a tongue dividing the duct 44 into two duct halves.

A closed space 45 is formed between the distribution ducts 44 for the floor nozzles and the actual ventilation housing 1, this space leading air from the outlet 26 to defroster outlets. Said space 45 is also divided by the intermediate wall 11, thus forming two half spaces. By forming each housing half 2 with a connection piece 46, air can be alternatively distributed from the outlets 26 to the defroster nozzles with the air of hoses or similar conventional means.

For operating the flaps 13,16 regulating the air flow in the hot air duct 12, a control panel 47 is adapted on the vehicle fascia panel, and comprising two sliding controls 48,49, one for the passenger side and one for the driver's side in the vehicle body. Said sliding controls 48,49 are adapted side by side and mutually parallel, thereby enabling just as simple operation of the two controls 48,49 as for the previously-described controls 29,30 for adjusting ventilation air.

Each sliding control 48,49 is connected to a lever 50 via a cable, said lever being attached to the rotatably mounted shaft for the flap 16 regulating the outlet 15 of the hot air duct 12. Said flap 16 is via the lever 19 attached to its shaft, and the connecting link 17 connected to the lever 18 on the shaft for the flap 16 at the inlet 14 of the hot air duct 12. This results in that pivoting of the lever 50 causes a corresponding pivoting of the flaps 13,16. In the case where the flap 13 at the inlet 14 of the hot air duct 12 is completely closed, the flap 16 for the outlet 15 of the hot air duct 12 is also entirely closed, and vice versa. Closed flaps 13,16 to the hot air duct 12 signify that all ventilation air passes through the cold air duct 10.

A lower end position for each sliding control 48,49 corresponds to entirely closed flaps 13,16 and is denoted by the numeral 51 in FIG. 3. In an upper end position 52 for each sliding control 48,49, the flaps 13,16 are completely open and the flaps 13 at the inlets 14 of the hot air ducts 12 will thus block the cold air ducts 10 so that all ventilation air passes through the hot air ducts 12 and becomes heated to a maximum. In positions between the above-mentioned end positions 51,52, the ventilation air can be divided to pass with some part of it going through the hot air duct 12 and with another part of it going through the cold air duct 10. This results in that the ventilation air can be given optional temperature in response to the proportions between cold and hot air.

In an advantageous embodiment, the two control panels 28,47 are arranged side by side on the vehicle fascia board in accordance with what is illustrated in FIG. 3. In addition thereto the fascia board is also provided with a control knob 53 for operating an electric fan mounted in the ventilation housing 1. When the knob is turned, different electrical resistors are connected, whereby the fan can be fed with different voltages for varying the speed of the fan. As a result of this, the quantity of ventilation air passing through the ventilation housing 1 can be varied.

The present invention is not solely confined to the exemplified embodiment, but can be modified into a plurality of embodiments within the scope of the following patent claims.

What I claim is:

1. In a heating and ventilating system for a vehicle, a housing comprising two housing halves connected along a longitudinal plane, said housing enclosing heat exchanger means, an air inlet chamber and fan means for passing outside air into the inlet chamber; a longitudinal intermediate wall mounted between the housing halves, said wall at least partially separating the space between the housing halves into two part spaces; and in each part space: a cold air duct in communication with the inlet chamber and with a mixing chamber, a hot air duct for passing selecting portions of air from the cold air duct through the heat exchanger means to the mixing chamber, a substantially cylindrical distribution chamber in communication with the mixing chamber and with a plurality of outlets leading to different parts of the interior of the vehicle, said distribution chamber including a distribution flap disposed in a diametric plane in the distribution chamber and pivotable about the axis of the distribution chamber for selectively directing air to any of said outlets.

2. A heating and ventilation system as claimed in claim 1, wherein the intermediate wall comprises at least one flat plate mounted between the housing halves.

3. A heating and ventilation system as claimed in claim 1, wherein each distribution chamber is formed with at least three outlets, which are placed within a sector having an angle of 180° or less, and that the outlet of each distribution chamber is adapted to open out into outlets in the vehicle passenger compartment via separate ducts and/or conduits, preferably close to the driver's and passenger seats in the vehicle.

4. A heating and ventilation system as claimed in claim 3, wherein outlets from one distribution chamber in the ventilation housing are connected to outlets in the vehicle passenger compartment on one side of the longitudinal centreline of the vehicle, and wherein outlets from the other distribution chamber are connected to outlets in the vehicle passenger compartment on the other side of said centreline.

5. A heating and ventilation system as claimed in claim 4, including means for enabling individual regulation of the ventilation air and for enabling individual heating of ventilating air on either side of a longitudinal centreline through the vehicle passenger compartment.

* * * * *